Sept. 1, 1970   H. T. WARCHOL   3,526,026
METHOD OF MAKING A CAGE FOR A TAPERED ROLLER BEARING
Filed Oct. 30, 1967   2 Sheets-Sheet 1

INVENTOR.
HENRY T. WARCHOL
BY Kenwood Ross and
Chester E. Havin
ATTORNEYS.

Sept. 1, 1970     H. T. WARCHOL     3,526,026

METHOD OF MAKING A CAGE FOR A TAPERED ROLLER BEARING

Filed Oct. 30, 1967     2 Sheets-Sheet 2

INVENTOR.
HENRY T. WARCHOL

BY Kenwood Ross and
Chester E. Flavin
ATTORNEYS.

United States Patent Office 3,526,026
Patented Sept. 1, 1970

3,526,026
METHOD OF MAKING A CAGE FOR A TAPERED
ROLLER BEARING
Henry T. Warchol, 2 Sackville Ave.,
Westfield, Mass. 01085
Filed Oct. 30, 1967, Ser. No. 678,928
Int. Cl. B21d 51/10; B31b 49/00; B31c 11/02
U.S. Cl. 29—148.4     2 Claims

ABSTRACT OF THE DISCLOSURE

The method of manufacturing a cage for a tapered roller bearing which includes the steps of punching spaced holes in a strip of sheet metal to form a blank having rim portions connected by spaced bars defining roller pockets therebetween for the reception of rollers, deforming one of said rim portions to elongate its length, forming said blank into frusto-conical shape, and welding together the abutting ends of said rim portions.

BACKGROUND OF THE INVENTION

Field of the invention

Cages or separators or retainers for roller bearings of the tapered roller or race type.

Description of the prior art

Tapered cages have been made by machining castings or forgings; or by cupping a sheet of metal, stamping out the cup bottom and cutting out the roller openings; or they have been formed from cylindrical stock in manner as set forth in expired U.S. Pat. No. 1,444,326.

Each of these methods has been deficient in that a high percentage of scrap is produced and each requires complicated and expensive dies and other machinery for secondary operations.

SUMMARY OF THE INVENTION

A primary object of the invention is to provide a simple, time-saving and economical method of producing a tapered roller bearing cage from flat strip stock, the bearing openings or pockets or windows being punched therein before forming, thereby eliminating the need for expensive dies or other secondary machinery which are required to punch such openings at an angle.

Another object is the provision of a method for producing tapered roller bearing cages, separators and retainers from flat metal blanks, one rim of the blank being elongated by mechanical means so that the finished cage will assume a frusto-conical shape.

DESCRIPTION OF THE PREFERRED
EMBODIMENTS

As a preferred method of carrying out the invention, a flat metal strip of indeterminate length is fed to a punching station where cage slots are punched therein and optionally coined; therefollowing, the so punched strip is fed to a stretching station where one rim is deformed or stretched to sinusoidal form; the so-punched and deformed strip is then cut to desired length at a cutting station, formed to desired frusto-conical shape at a forming station and the free ends joined together by welding or other means at a finishing station.

Of course, it will be understood that certain of the steps outlined above could be combined or their order changed. For instance, the punching and stretching operations could be performed simultaneously or coining could be performed during or after stretching or during cutting. Thus, I do not desired to be limited to the particular method steps described as they may be varied to meet particular operating requirements.

Figure 1:
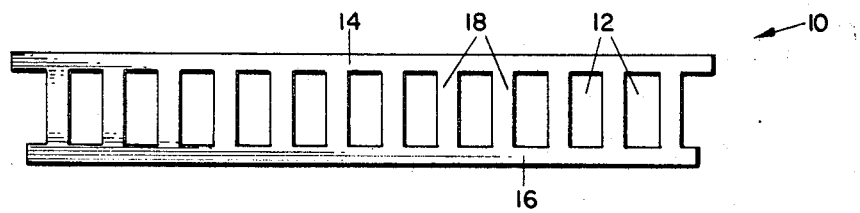
FIG. 1 is a top plan view of a flat sheet metal strip having roller slots punched therein.

With reference now to the drawing, FIG. 1 shows a flat, sheet metal strip 10 of predetermined length and uniform thickness, the strip having been prepunched to provide a plurality of identical cage slots 12 therein, said cage slots providing upper and lower longitudinally-extending rims 14 and 16 respectively interconnected by transversely-extending bars 18 which bound the slots.

Figure 2:
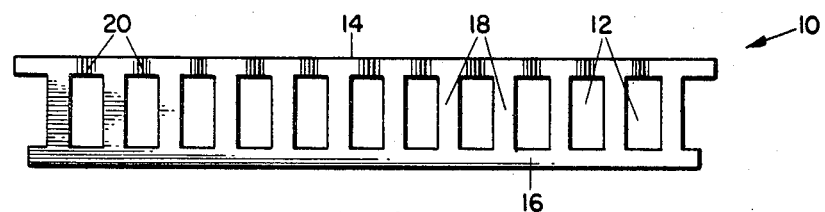
FIG. 2 is a top plan view of the metal strip of FIG. 1 following stretching or deforming.
Figure 3:
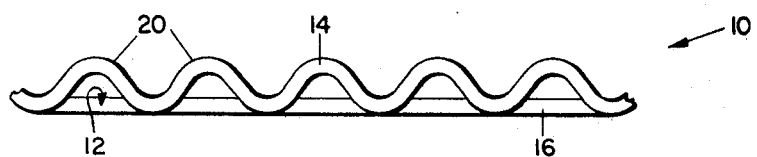
FIG. 3 is an enlarged, fragmentary, side elevational view of the formed strip of FIG. 2.

Upper rim 14 is deformed or stretched to the sinusoidal form illustrated in FIGS. 2 and 3 by applying forming punches, not shown, to one planar face thereof to provide a series of equi-spaced undulations 20 in the upper rim, each such undulation being positioned centrally between a pair of bars 18 so as to overlie a slot 12.

The so-deformed strip is now moved to a forming station, not shown, comprising a forming arbor of the desired frusto-conical shape and two or more forming tools which form the strip around the arbor while simultaneously flattening the undulations 20.

The upper rim 14, having been stretched by the undulations, is able substantially to assume the larger diameter called for by the taper of the arbor.

Figure 4:
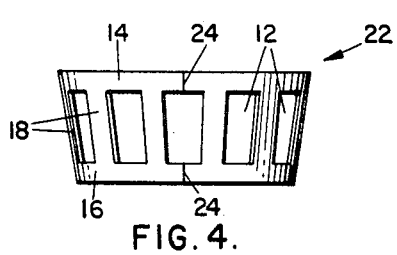
FIGS. 4 and 5 are elevational and prospective views respectively of tapered bearing cages formed by the method of the invention.
Figure 5:
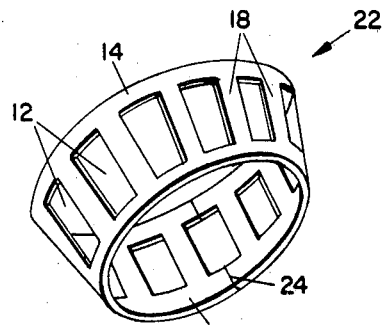

The now-formed frusto-conical cage 22, illustrated in FIGS. 4 and 5, is removed from the arbor and the abutting ends of the rims 14 and 16 are joined together as at 24 by welding or any other suitable means.

Figure 6:
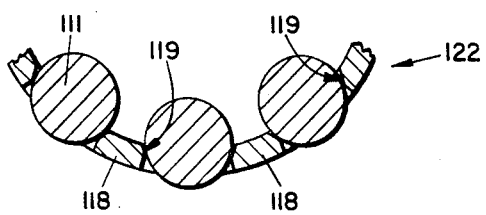
FIG. 6 is an enlarged, transverse, cross-sectional view taken through a modified form of bearing cage formed by the method of the invention.
Figure 7:
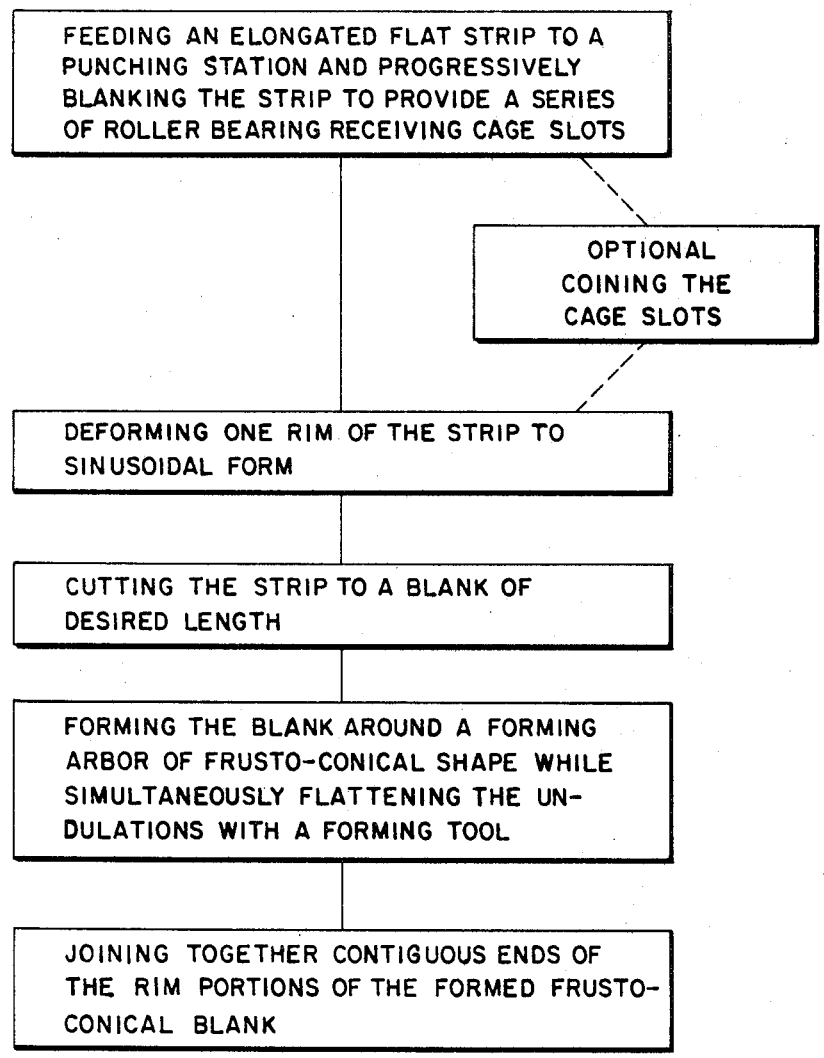
FIG. 7 is a flow chart showing the sequence of the various steps of the method of the invention.

In the modified tapered cage 122 of FIG. 6, roller bearings 111 are disposed in cage slots separated by equispaced bars 118.

The inside vertical edges of each bar have been bevelled or coined as at 119 to retain the bearings at the proper pitch diameter and to provide a wide surface on which the bearings can ride.

The bevelling or coining operation may be performed after punching, before or after or during stretching or during cutting.

I claim:
1. A method of making a tapered roller bearing cage comprising the steps of:
   (a) feeding an elongated strip of thin flat metal to a punching station and progressively blanking the strip to provide a longitudinally-extending series of later- ally-elongated roller bearing receiving cage slots between opposite rim portions;
(b) therefollowing deforming one of the rim portions of the strips into sinusoidal undulations;
(c) progressively severing selected portions of the strip to provide blanks from the main strip;
(d) forming each blank around a forming arbor of frusto-conical configuration while simultaneously flattening the undulations with a forming tool; and
(e) joining together the contiguous ends of the rim portions of each formed frusto-conical blank.

2. The method according to claim 1, including the step of covering certain of the edges of the cage slots.

References Cited

UNITED STATES PATENTS

| 894,711 | 7/1908 | Worchester | 29—148.4 |
| 1,144,451 | 6/1915 | Vanderbeek | 29—148.4 |
| 1,446,487 | 2/1923 | Timken | 29—148.4 |
| 1,928,823 | 10/1933 | Young | 29—148.4 |
| 3,313,582 | 4/1967 | Hubbell | 29—148.4 |
| 3,365,775 | 1/1968 | Cavagnero | 29—148.4 |

WAYNE A. MORSE, Jr., Primary Examiner

U.S. Cl. X.R.

93—94

PO-1050
(5/69)

UNITED STATES PATENT OFFICE
CERTIFICATE OF CORRECTION

Patent No. 3,526,026          Dated September 1, 1970

Inventor(s) Henry T. Warchol

It is certified that error appears in the above-identified patent and that said Letters Patent are hereby corrected as shown below:

Column 3 line 13, Claim 2 - change "covering" to -- coining --

Signed and sealed this 28th day of September 1971.

(SEAL)
Attest:

EDWARD M. FLETCHER, JR.                ROBERT GOTTSCHALK
Attesting Officer                      Acting Commissioner of Patents